3,450,808
METHOD OF PREPARING A SYNTHETIC
STONE MATERIAL
Albert L. Roberts, 4309 Paseo de las Tortugas,
Torrance, Calif. 90505
No Drawing. Filed Aug. 24, 1966, Ser. No. 574,550
Int. Cl. B29c 3/00
U.S. Cl. 264—120        14 Claims

ABSTRACT OF THE DISCLOSURE

A method of manufacturing a structural material having the properties of natural stone, said method comprising mixing a thermosetting resin including conventional resin additives and having a viscosity ranging from about 50,000 to about 100,000 centipoises with a sized aggregate, the largest size particle fraction in said aggregate having a mesh size not larger than about ⅓ the thickness of the final product with the average mesh sizes of succeeding smaller particle fractions varying with respect to the preceding larger sized particle fraction by a factor of about three until the smallest size particle size fraction is reached in which the particles have an average size of about 1 to about 10 microns, said resin comprising from about 5 to about 11% by weight and said sized aggregate comprising substantially the balance, molding the mixture of resin and sized aggregate, and curing said molded mixture.

---

This invention relates to a structural material and the method for its manufacture. More specifically, this invention relates to a structural material having both the outer appearance and the properties of stone and the method employed in its manufacture.

Natural stone, such as granite and marble, is quite expensive and is difficult to shape. Thus, its use as a building material has been limited to those structures which could afford its added cost.

Various synthetic materials having the general appearance of marble or granite are available commercially. These materials are generally composed of a thermosetting resin having stone chips admixed therein so as to give the appearance of natural stone.

Such synthetic materials have not been satisfactory since their chemical and physical properties fall far short of those of marble or granite. These materials generally contain a large quantity of thermosetting resin in relation to the amount of stone particles which are contained therein. The result is that the final product is soft, can be scratched, and has the properties of the thermosetting binder material rather than those of marble or granite.

An object of this invention is to provide a dense, hard, structural material having the properties of natural stone.

Another object is to provide a dense, strong, structural material having the properties of natural granite.

A further object is to provide a method for making a structural material which is dense and strong and has the physical properties of natural stone or granite.

Additional objects will become apparent from a reading of the specification and claims which follow.

My invention involves the admixing of sized stone particles with a thermosetting resin followed by curing of the resin to form a hard ceramic object. Although any naturally occurring stone-like material can be employed, I prefer the use of quartz particles in order that the resulting product have the outer appearance of granite.

Various thermosetting resins may be employed in my invention. As an example, I can employ phenolic resins such as those formed from reaction of phenol with formaldehyde or resorcinol with formaldehyde. Similarly, I can employ furfural resins resulting from reaction of furfural with a phenol. Other types of resins which I can employ are the urea-formaldehyde resins or melamine resins as formed, for example, by condensing melamine with 2,4,6-triamino-s-triazine.

Still another class of thermosetting resins which I may employ are the polyurethanes formed, for example, from reaction of an aromatic isocyanate such as tolylene diisocyanate with a glycol or polyester or polyether having at least two terminal hydroxyl groups. As an additional ingredient, I include a trihydroxy compound such as hexanetriol in order to give a cross-linked product.

A preferred category of thermosetting resins for use in my invention are the polyesters. These resins are formed from the reaction of a polyhydric alcohol, mixtures of polyhydric alcohols or mixtures of polyhydric and monohydric alcohols with an alpha unsaturated alpha, beta polycarboxylic acid or a plurality of polycarboxylic acids one of which at least is an alpha unsaturated alpha, beta polycarboxylic acid. Examples of such polyhydric alcohols are ethylene glycol, di- and tri-ethylene glycols, propylene glycol, trimethylene glycol, tetramethylene glycol, pentamethylene glycol, glycerine or pentaerythritol alone or in combination with a monohydric alcohol, etc. Examples of unsaturated polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of appropriate saturated polycarboxylic acids are succinic, adipic, sebacic, phthalic, and isophthalic acids.

Preferably, the unsaturated polyester is an isophthalate unsaturated polyester since these polyesters have a relatively high viscosity in comparison to similar polyesters, e.g., phthalic anhydride unsaturated polyesters, and in addition have higher heat distortion temperatures and better flexural and impact strength properties upon curing. The molar ratio of isophthalic acid to unsaturated acid can be varied as desired to produce an unsaturated polyester having a viscosity in the range of about 50,000 to about 100,000 centipoises. In general, as the molar ratio of isophthalic acid to unsaturated acid is decreased, the rigidity and brittleness of the cured resin is increased.

In addition to the above unsaturated polyester there is present a cross-linking agent. Examples of cross-linking agents are styrene, diallyl phthalate, triallyl cyanurate, and in fact, any material which has vinyl unsaturation and which can be polymerized can be employed as a cross-linking agent. Examples of such materials are divinyl benzene, vinyl toluene, methyl methacrylate, and the like. Mixtures of cross-linking agents may also be employed such as, for example, a mixture of vinyl toluene with diallyl phthalate.

Another preferred category of thermosetting resins for use in my invention are the allylic resins. As pointed out above, an allyl ester, such as diallyl phthalate or triallyl cyanurate may be employed as the cross-linking agent in the formation of a polyester. To distinguish the allylic resins from polyesters containing an allyl ester as a cross-linker, the allylic resins may be defined as resins formed from the homopolymerization of an allyl ester, or the copolymerization of different allyl esters. Various allyl monomers may be employed in forming the allylic resin according to my process. To name but a few, such allyl esters include diallyl orthophthalate, diallyl metaphthalate, diallyl maleate, diallyl chlorendate, diethylene glycol bis (allyl carbonate), triallyl cyanurate, N,N-diallyl melamine, diallyl diglycollate, dimethyallyl maleate, and diallyl adipate.

The allylic monomer or monomers or a mixture thereof with an allylic polymer in the β-stage may be cured by the use of a peroxide catalyst. Typical of such catalysts are benzoyl peroxide, tert-butyl perbonzoate, or diisopropyl peroxydicarbonate.

To the thermosetting resin which I employ and which contains a polymerization inhibitor is added a sized aggregate. By sized aggregate, I mean an aggregate which is composed of particles having selected sizes such that the particles intermesh with one another to reduce the void space between particles to a minimum. The size of the largest particles employed in the aggregate is purposefully chosen to have a size not larger than approximately ⅓ the thickness of the final product. Thus, when forming a slab having a thickness of approximately ⅜ inch, the largest size particles which are employed have a size of approximately 10 mesh. The next smaller sized particle is of a size whose average mesh (expressed in terms of the U.S. Standard Sieve Series) is a number approximately 3 times that of the next succeeding larger sized particle. To illustrate in regard to a ⅜ inch slab, the largest sized particle has an average size of 10 mesh, the next smaller size is 27 mesh, the next 87 mesh and the next 290 mesh.

Speaking again in terms of a ⅜ inch slab, the 27, 87 and 290 mesh particles are approximately spherical and occur naturally in this form. The 10 mesh particles, in the case of quartz, are not obtainable in a spherical form and have a jagged configuration.

In addition to the sized particles, I may also employ a small quantity of aluminum hydroxide in an amount sufficient to impart flame retardant properties to the finished product. This material has a tendency to make the resin-aggregate mixture thixotropic such that it has a high apparent viscosity and yet will flow when sufficient force is applied to it. Moreover, aluminum hydroxide has the property of decomposing at high temperatures to release water and thereby retard burning.

Other flame retardant materials which can be used in lieu of aluminum hydroxide include, for example, diallyl chlorendate, tricresyl phosphate, tris(dichloropropyl) phosphate, chlorendic anhydride, tetrachloro phthalic anhydride, unsaturated chlorophenols, or an antimony compound, such as antimony oxide in conjunction with a chlorinated resin ingredient. It is necessary, of course, that the flame retardant material be compatible with the resin and the flame retardant will, therefore, be varied to suit the resin employed.

In forming my products, I have found the viscosity of the resin mixture and the weight of the resin mixture employed to be critical. The thermosetting resins which I employ including conventional additives such as curing catalysts, coupling agents, cross-linking agents, ultra-violet light absorbers, etc., have a viscosity from about 50,000 to about 100,000 centipoise and are employed in a total concentration of about 5 to about 11% by weight of the entire mixture with the balance being sized aggregate as described above.

If too little resin is employed, the resin will not fill up the voids between particles with the result that the resin-aggregate mixture will not flow to conform to a given shape when subjected to pressure in a mold. On the other hand, when too much resin is employed, air is trapped within the final product to give a product of decreased strength and density.

Although the order of addition of the particulate material to the resin is not critical, I prefer to mix in the following manner since I have found that it gives a more uniform final product. (1) Stir the resin including the cross-linking ingredients and the polymerization catalyst, as hereinafter defined, in a mixer, such as a sigma blade mixer or a Mull type mixer at about 150° F. (2) Then add aluminum hydroxide and the finest particulate material which is employed, such as the 290 mesh material. (3) Then mix for 5 minutes or until a uniform consistency is obtained. (4) Then add the next larger size particulate material, such as the 87 mesh material, and mix for an additional 5 minutes or until a uniform consistency is obtained. (5) Then add the next larger material, such as the 27 mesh material, and mix for an additional 5 minutes or until a uniform consistency is obtained. (6) Add the next larger size particulate material, such as the 10 mesh material, and mix for 5 minutes or until a uniform consistency is obtained.

A different procedure is followed in the addition of the largest sized particulate material, such as the 10 mesh material, if it is desired that the final product have a mottled grain, such as streaks of black and white, to approximate the coloration of natural granite. In this instance, the coarsest material, which is colored white, is added to the mixture, then mixed for a relatively short period of time such as 1 or 2 minutes. Then the coarse material of approximately the same particle size which is colored black is added to the mixture and likewise mixed for a short period of time such as 1 or 2 minutes. By employing such a procedure, the white and black particles are not uniformly distributed throughout the mix with the result that the final product has a mottled color with streaks or black running through a white background.

After mixing, which occurs at about 150° F. to about 200° F. when using a polyester resin binder, the mixed material is transferred to a preform mold which is slightly smaller in dimension than the final mold. The material is pressed in the preform mold at temperatures ranging from between 150° to 200° F. and a pressure in the range of 500 to 1500 p.s.i. When using a vibrating mold, the pressure can be greatly reduced down to as low as about 10 p.s.i.

After being pressed in the preform mold, the material is transferred to a hot mold where it is pressed at approximately 1000 p.s.i. at a temperature in the order of 320° F. The material is held in the final mold for a time which is equivalent to approximately 2 minutes for each ½ inch of thickness of the final molded product. If desired, other pressures can be employed for the final molding operation ranging from about 500 p.s.i. up to whatever pressure the mold will stand.

It should be understood that the process conditions set forth above are those which I prefer to employ when utilizing an allylic resin, as defined previously, or a polyester binder formed from an unsaturated isophthalate polyester which is cross-linked with unsaturated compounds such as vinyl toluene and diallyl phthalate or mixtures thereof. When utilizing other thermosetting resins as the binder for my products, I can, of course, vary the process conditions to suit the particular thermosetting resin employed.

An alternative procedure to that set forth above is to employ a less viscous resin mixture which contains a viscosity delay agent. In this procedure, the viscosity of the resin mixture including additives such as curing catalysts, coupling agents, cross-linking agents, etc., has a lower viscosity of about 2000 to about 6000 cps. Included in the resin mixture is magnesium oxide or magnesium hydroxide in a concentration range of about ¼ to about 4% by weight of the final product. The magnesium oxide or magnesium hydroxide is relatively finely ground such that it will pass through a 325-mesh screen. In general, magnesium hydroxide gives a longer viscosity delay than does magnesium oxide. The magnesium oxide is generally a highly refined, calcined material. The mechanism of the magnesium compound in causing a delayed thickening action is a complex one which is not entirely understood. However, it has been observed that the particle size, shape and the prior thermal history of the magnesium compound all have an effect upon the delay time achieved by its addition.

In general, the quantity of magnesium compound added is sufficient to give about a 30 minute time delay after which the resin mixture thickens greatly to a viscosity in the range of about 50,000 to about 100,000 cps. This allows mixing of the sized aggregate material into the resin mixture and placing of the mixed material into the preform mold before it thickens to the necessary viscosity of about 50,000 to about 100,000 cps. prior to molding. For some reason, which is not understood, it has been found that the use of magnesium oxide or magnesium hydroxide in this manner reduces the shrinkage of the final product during curing.

As set forth previously, the largest sized aggregate employed in my product has an average size which is preferably not larger than 1/5 the thickness of the final product. In the case of a 3/8 inch thick final product, the largest sized aggregate has an average mesh size of about 10 mesh. If the final product were to have a thickness less than 3/8 inch, the largest sized particles employed would have a particle size somewhat less than 10 mesh, depending upon the thickness of the product. In addition, I have found that the largest sized particles employed, irrespective of the thickness desired in the final product, should preferably not have a particle size larger than about 10 mesh. This consideration is dictated by the fact that particles having a size larger than about 10 mesh are extremely difficult to mold because of the abrasive action of the large particles on the mold surfaces.

Further, as stated previously, the next smaller particle size has a mesh approximately 3 times that of the larger size, etc. This procession from largest to smallest sized particles, with each step resulting in a mesh approximately 3 times that of the preceding mesh size, is continued until the smallest sized particles are added which have a size in the order of about 1 to about 10 microns. Thus, the sizing of the aggregate employed in my product may be described as employing as the largest sized aggregate a material whose average particle size is not larger than 1/5 that of the thickness of the final product and which is preferably not larger than about 10 mesh, with the mesh sizes of the succeeding particles varying with respect to each other by a factor of 3 until the smallest sized particle is reached which has an average size of about 1 to about 10 microns.

In addition to the resin ingredients set forth previously, I also employ a curing catalyst. The particular catalyst employed will, of course, vary with the nature of the thermosetting resin which is employed. In the case of a polyester resin system, typical catalysts are the peroxide catalysts such as benzoyl peroxide, methylethyl ketone peroxide, cyclohexanone peroxide, cumene hydroperoxide, bis(phthalyl) peroxide, ditertiary-butyl peroxide, tertiary butyl perbenzoate, 2,2-bis(tertiarybutylperoxy) butane, and the like.

In addition, I can employ polymerization retardants, polymerization stabilizers, polymerization accelerators and promoters, dies, pigments, UV stabilizers, antioxidants, and the like. Such ingredients are well known to the art and can be selected to suit the particular thermosetting resin employed and the speed of catalysis desired in the process.

In the case of a thermosetting resin employing, at least in part, a silica-containing material such as sized quartz particles as the aggregate, I prefer to employ a silane coupling agent such as a methyl methacrylate silane compound. Such compounds are manufactured by Dow Corning Company. They have a molecular structure in which one portion of the molecule is an unsaturated organic which will bond to the resin during curing while the other portion of the molecule is primarily inorganic and has an affinity for the silica-containing particles. As a result, the particles are more firmly bound together by the resin binder with the result that the physical properties of the finished product are greatly improved. In particular, I have found that my products which did not contain a methyl methacrylate silane bonding agent were reduced in strength when treated with boiling water. Conversely, those of my products containing this coupling agents retained their strength when treated with boiling water. Other typical silane coupling agents including glycidoxy-propyltrimethoxy silane, N-β-aminoethyl-α-aminopropyl trimethoxy silane, sold as Dow Corning Z–6040 and Z–6020, respectively.

To further illustrate my invention there are presented the following examples in which all parts and percentages are by weight unless otherwise indicated.

EXAMPLE I

To a Sigma bladed mixer was added 7.88 parts of a resin sold by Sylmar Chemical Company as SCC 5335 which contains 7% of vinyl toluene, 14% of diallyl phthalate with the balance being an isophthalate unsaturated polyester. After mixing for a short period of time there was added 6.02 parts of quartz particles having an average particle size of 290 mesh and 6.48 parts of aluminum hydroxide. There was then added 0.11 part of a methyl methacryalate silane bonding agent sold by the Dow Corning Chemical Company as Dow Corning Z–6030 in admixture with 1.33 parts of diallyl orthophthalate and 0.1 part of a peroxide curing catalyst. After mixing for 5 minutes, 14.83 parts of quartz having an average particle size of 87 mesh were added and mixing was continued for an additional 5 minutes. I then added 22.23 parts of quartz having an average mesh size of 27 and mixing was continued for 5 minutes. Following this, 40.77 parts of quartz having an average mesh size of 10 were added and mixing was continued for an additional 5 minutes. The material was then transferred to a preform mold where it was pressed at a temperature of about 150° F. and a pressure of about 1000 p.s.i. After being maintained in the preform mold for approximately 5 seconds, it was transferred to a hot mold having a temperature of 320° F. where it was pressed at 1000 p.s.i. for 1.25 minutes. The material was then removed from the hot mold in the form of a densely compacted artificial granite slab.

EXAMPLE II

Example I was repeated employing as the resin 7.88 parts of an allylic resin comprising approximately 25% of diallyl orthophthalate polymer in the β stage and 75% of diallyl orthophthalate monomer. Such a material is available under the trade name Dapon from Food Machinery Corporation. Finely divided magnesium oxide in an amount equal to 1% by weight of the final product was added to the resin mixture. The particular magnesium oxide employed was FMC No. 2665. In all other respects the procedures and quantities of ingredients were the same as in Example I. The initial viscosity of the resin mixture was about 2000 cps. and it was found that the viscosity of the resin increased sharply to about 50,000 cps. during the premolding operation.

As stated previously, I have found the resin content to be a critical factor in the preparation of my products. The total resin content including auxiliary additives such as curing catalysts, coupling agents, cross-linking agents, etc., ranges from about 5 to about 11% by weight of the entire mixture. The balance of the mixture is composed of sized aggregate, as described previously, and optionally includes a flame retardant and a magnesium compound to delay thickening of the mixture.

The purpose of my invention is to produce a very dense structural material having the properties of natural stone. Thus, the relative proportions of each of the various sized portions employed in the aggregate are chosen to achieve maximum density and least voids. The relative proportions of the various size materials in the aggregate will vary depending upon the shape of the various size aggregate materials. In general, the intermediate size portions, such as 27 and 87 mesh materials, are substantially spherical. The large particles, such as 10 mesh materials, have a generally jagged configuration and the very smallest particles also have jagged configurations. A simple way to determine the relative proportions of the various sized materials is to fill a container with the largest sized particles to be used, such as 10 mesh. There is then added to the container the next smaller sized particles which have a mesh approximately three times that of the largest particles. The smaller sized particles are added to the larger sized particles with mixing until no more of the smaller sized particles can be added without increasing the total volume of material. Following this, the still next smaller size particle size, such as about 87 mesh, is added with mixing until no more of the 87 mesh material can be added without increasing the volume. The next smaller particle size material, such as about 290 mesh, is then added with mixing until no more can be added without increasing the volume. Following this, aluminum hydroxide, if employed, is added to the container with mixing until no more can be added without increasing the volume. In this manner, the proper proportions of each of the various particle sizes can be determined irrespective of variations in the shape of a particular size fraction depending upon its source of origin, etc.

Typically, suitable weight percentages of the various sized aggregate, when utilizing quartz particles, is about 30 to about 50% of a 10 mesh material, about 18 to about 30% of a 27 mesh material, about 8 to about 18% of an 87 mesh material, about 5 to about 8% of a 290 mesh material, about 5 to about 10% of aluminum hydroxide, and as stated previously, about 5 to about 11% of thermosetting resin including the various conventional resin additives.

As shown in the foregoing specification and examples, my method functions to produce a very hard structural material having the properties of stone. Due to its method of manufacture, the material produced can be made in fairly thin sheets such as about 3/8 of an inch in thickness. Natural stone materials, such as granite, cannot be produced to such thickness but rather must be much thicker. As a result, granite slabs are very heavy. This makes them impractical for use as building surface materials in a tall building where it is desirable to keep the weight of the building surface material to a minimum.

The structural materials produced according to my method are quite unique in their high density, hardness, and the firm bond between the aggregate particles and resin. In fracture tests which I have performed with my materials, I have found that they are so firmly bonded that fracture occurs through the grains of the aggregate material rather than through the resin.

I claim:

1. A method of forming a structural material comprising mixing from about 5 to about 11% of a thermosetting unsaturated polyester resin having a viscosity from about 50,000 to about 100,000 centipoises, said resin including conventional resin additives, with a sized silica-containing aggregate in which the largest size fraction of said aggregate has an average particle size not larger than 1/5 the thickness of the final product and not larger than about 10 mesh, and the mesh sizes of the succeeding smaller particle fractions have an average mesh size which is about three times the mesh size of the preceding larger particle size fraction and the smallest sized particle fraction has an average size of about 1 to about 10 microns, said sized aggregate comprising substantially the balance of said mixture, transferring the mixed material to a preform mold which is slightly smaller in dimension than the final mold and pressing the material in the preform mold at a temperature ranging between about 150 to about 200° F., transferring the preformed material to a hot mold and pressing it at a pressure of about 500 p.s.i. or greater at a temperature of about 320° F., and holding the material in the final mold for a time equivalent to approximately 2 minutes for each 1/2 inch of thickness of the final molded product.

2. The method of claim 1 wherein said polyester resin is an isophthalate polyester resin.

3. The method of claim 2 wherein said polyester resin contains diallyl phthalate as a cross-linking agent.

4. The method of claim 2 wherein said resin has an initial viscosity ranging from about 2000 to about 6000 centipoises and contains in addition finely ground magnesium oxide in amount ranging from 1/4 to about 4% by weight of the total mixture.

5. The method of claim 1 wherein the resin-aggregate mixture contains aluminum hydroxide in an amount sufficient to impart flame resistant properties to the cured product.

6. The method of claim 5 wherein the resin-aggregate mixture contains a silane coupling agent in minor amount, said coupling agent being characterized as having a molecular structure in which one portion of the molecule is an unsaturated organic moiety which bonds to the resin during curing while the other portion of the molecule is primarily inorganic and has an affinity for the silica-containing particles.

7. The method of claim 1 wherein said succeeding smaller particle fractions include intermediate sized fractions of quartz particles which are substantially spherical in shape.

8. The method of claim 7 wherein said intermediate sized fractions have particle sizes of about 27 and about 87 mesh.

9. A method of forming a structural material comprising mixing from about 5 to about 11% of a thermosetting allylic resin having a viscosity from about 50,000 to about 100,000 centipoises, said resin including conventional resin additives, with a sized silica-containing aggregate in which the largest size fraction of said aggregate has an average particle size not larger than about 1/5 the thickness of the final product and not larger than about 10 mesh, and the mesh sizes of the succeeding smaller particle fractions have an average mesh size which is about three times the mesh size of the preceding larger particle size fraction and the smallest sized particle fraction has an average size of about 1 to about 10 microns, said sized aggregate comprising substantially the balance of said mixture, transferring the mixed material to a preform mold which is slightly smaller in dimension than the final mold, and pressing the material in the preform mold at a temperature ranging between about 150 to about 200° F., transferring the preformed material to a hot mold and pressing it at a pressure of about 500 p.s.i. or greater at a temperature of about 320° F., and holding the material in the final mold for a time equivalent to approximately 2 minutes for each 1/2 inch of thickness of the final molded product.

10. The method of claim 9 wherein said resin has an initial viscosity ranging from about 2000 to about 6000 centipoises and contains in addition finely ground magnesium oxide in amount ranging from 1/4 to about 4% by weight of the total mixture.

11. The method of claim 9 wherein the resin-aggregate mixture contains aluminum hydroxide in an amount sufficient to impart flame resistant properties to the cured product.

12. The method of claim 1 wherein the resin-aggregate mixture contains a silane coupling agent in minor amount, said coupling agent being characterized as having a molecular structure in which one portion of the molecule is an unsaturated organic moiety which bonds to the resin during curing while the other portion of the molecule is primarily inorganic and has an affinity for the silica-containing particles.

13. The method of claim 9 wherein said succeeding smaller particle fractions include intermediate sized fractions of substantially spherical quartz particles.

14. The method of claim 13 wherein said intermediate sized fractions have particle sizes of about 27 and about 87 mesh.

References Cited

UNITED STATES PATENTS

| | | | |
|---|---|---|---|
| 3,108,985 | 10/1963 | Weyer | 260—37 |
| 3,189,568 | 6/1965 | Sparks | 260—22 |
| 3,193,519 | 7/1965 | Gessler | 260—33.6 |
| 3,278,662 | 10/1966 | Mangrum | 264—77 |
| 3,328,231 | 6/1967 | Sergovic | 260—40 |
| 3,328,339 | 6/1967 | Tierney | 260—37 |
| 3,366,720 | 1/1968 | Burger | 264—122 |

ROBERT F. WHITE, *Primary Examiner.*

R. R. KUCIA, *Assistant Examiner.*

U.S. Cl. X.R.

264—77, 122, 71, 294